Figure 1:
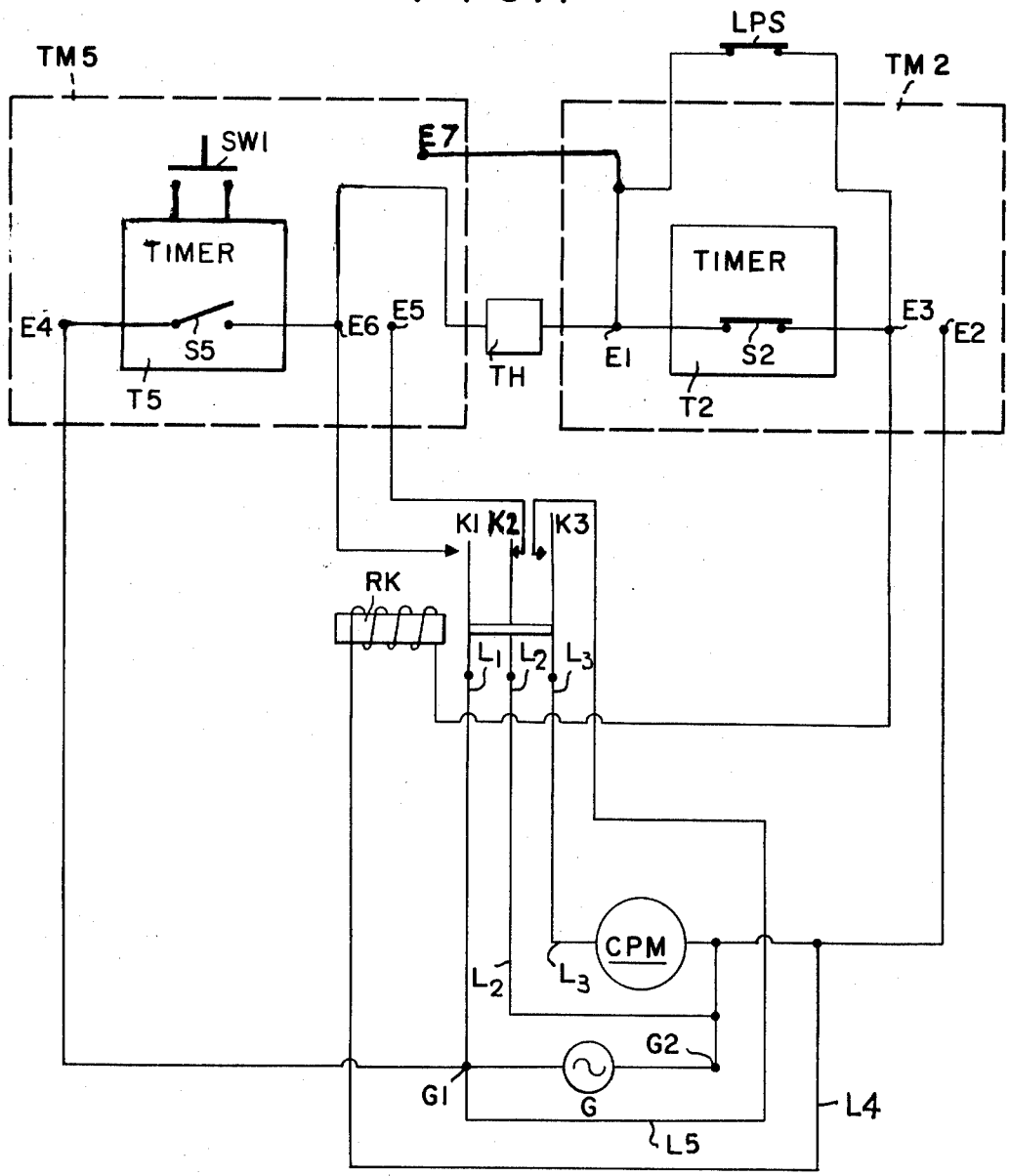

United States Patent
Granieri et al.

[15] 3,700,914
[45] Oct. 24, 1972

[54] CONTROL APPARATUS FOR AIR CONDITIONING AND LIKE SYSTEMS

[72] Inventors: George John Granieri, Piscataway; Edward Herbert Lefkowitz, Edison, N.J.

[73] Assignee: The Tappan Company, Mansfield, Ohio

[22] Filed: Nov. 20, 1970

[21] Appl. No.: 91,446

[52] U.S. Cl. ............... 307/141, 307/293, 318/484
[51] Int. Cl. ............................................. H01h 43/00
[58] Field of Search..318/471, 472, 473, 481, 484 X; 307/293 X, 141, 141.4; 317/141

[56] References Cited

UNITED STATES PATENTS

| | | | |
|---|---|---|---|
| 3,434,028 | 3/1969 | McCready | 318/484 |
| 3,142,013 | 7/1964 | McGrath et al. | 318/484 X |
| 3,439,191 | 4/1969 | Kraemer | 307/293 |

*Primary Examiner*—Herman J. Hohauser
*Attorney*—Jefferson Ehrlich, Tennes I. Erstad and Robert G. Crooks

[57] ABSTRACT

Control equipment for power-operated mechanism, such as an air-conditioning system including circuitry for preventing the operation or re-operation of the compressor or other load until the expiration of a substantial predetermined interval of time after the compressor or load has been released. This equipment will prevent the frequent intermittent operation of the motor of a compressor if, for example, the thermostat or a switch or any other control element were jiggled or moved erratically. This equipment also prevents the operation of the compressor or other load unless, within a second predetermined time interval, the pressure in the supply line feeding fluid to the compressor or load has reached a desired or predetermined pressure. If the predetermined pressure has not been attained, the circuitry will release the compressor motor or load.

14 Claims, 3 Drawing Figures

INVENTORS,
GEORGE J. GRANIERI
EDWARD H. LEFKOWITZ
BY Jefferson Ehrlich
ATTORNEY

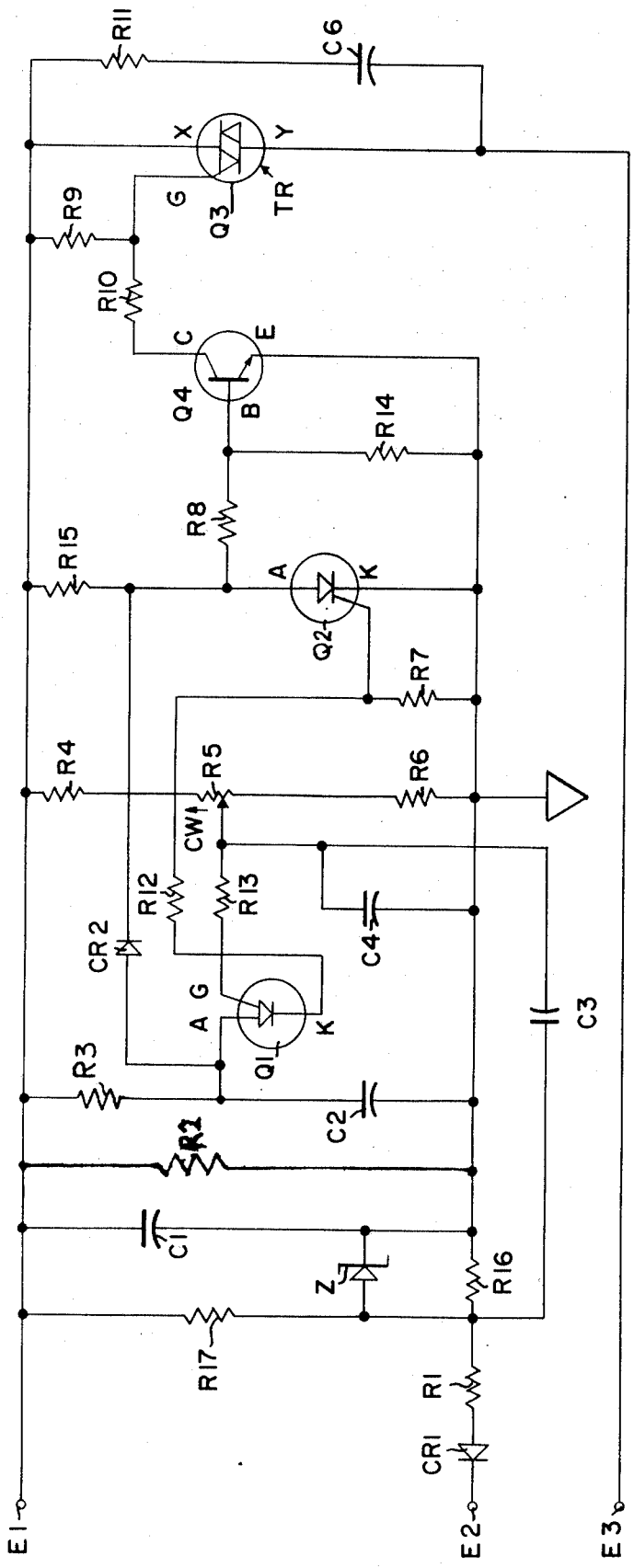

CONTROL APPARATUS FOR AIR CONDITIONING AND LIKE SYSTEMS

This invention relates to timing apparatus for controlling the operation of a load or power-operated equipment, such as a compressor motor which may be part of an air-conditioning system.

One of the difficulties often encountered, for example, in air-conditioning equipment, arises inadvertently from the frequent and intermittent operation of the equipment due to the repeated opening and closure of the contacts of a thermostat or of a relay contact in the circuit of the compressor motor or due to any other switching or vibratory element. By turning the compressor motor on and off frequently due, for example, to the improper operation of a relay contact or a thermostat or other means, the compressor motor will be subjected to considerable unwarranted wear and tear due to the unnecessary starting and stopping of the compressor motor. This will reduce the life of the compressor motor and, in due course, render the entire air-conditioning system "out-of-order." These factors may similarly adversely affect the operation of a boiler system, or an electrical elevator system, or any other load. This invention will be generally described and exemplified with respect to an air-conditioning system, but it is to be understood that the features of the invention are likewise applicable to any load which may suffer or default from repeated inadvertent operations.

One of the principal objects of the present invention is to provide equipment which will prevent the inadvertent recurrent, intermittent and repeated operations of a compressor motor of an air-conditioning system or other load until a predetermined or first interval of time, such as five minutes, has expired. Thus, in accordance with this objective, the compressor motor will be brought into operation, or brought into reoperation, only if the equipment has been kept idle for a substantial predetermined interval of time, thereby to prevent the sudden operation or re-operation of the equipment.

Another of the objects of this invention is to provide equipment to start and operate equipment, such as a compressor motor, as long as may be desired, but to prevent any re-operation of the motor until the expiration of a substantial delay interval before the motor may be re-started, thereby avoiding unwanted or inadvertent starting sequences of the motor.

Another of the objects of this invention is to prevent the operation or re-operation of the compressor motor of an air-conditioning system or other load at the end of the prescribed interval of time unless there has been a call for operation of the compressor motor in response to, for example, the actuation of the switch contacts of a thermostat pursuant to a demand for operation of the compressor motor and unless the fluid required for the system or load has reached a predetermined pressure.

As already suggested, this invention is provided to prevent the operation or re-operation of the motor of an air-conditioner unless a sufficient delay interval has expired. If, after the predetermined interval of time has elapsed, there is no demand for operation of the compressor motor because the thermostat, in responding to temperature changes, has failed to become actuated in the meantime, the compressor motor will remain released. Thus, in accordance with this invention, the compressor motor may be brought into operation only after the equipment has been kept idle for the predetermined time interval, and it will continue to remain idle thereafter unless there has meanwhile been a call for re-operation by, for example, the thermostat control equipment upon the expiration of the predetermined time interval.

It is, therefore, still another object of this invention to associate the timing or delay circuit of this invention with a load, such as a compressor motor, so arranged that the timing circuit will be activated to establish a predetermined time interval and the compressor motor will be held unoperated during the tolling of the time interval, but the compressor motor will become operated only upon the expiration of the time interval if the thermostat is closed. Hence, each release of the compressor motor will re-start the tolling of the time interval, but the motor must await the expiration of the time interval before the motor can be re-started into operation (again assuming the thermostat is closed).

In accordance with the present invention, the chattering of a relay contact, or the sudden changes in the temperature in the vicinity of a thermostat causing the thermostat to operate and release frequently during a brief period of time, are minimized or eliminated by associating a special timing circuit with the compressor motor so as to automatically prevent the compressor motor from operating until a sufficiently long interval of time, such as five minutes, has expired.

Figure 2:
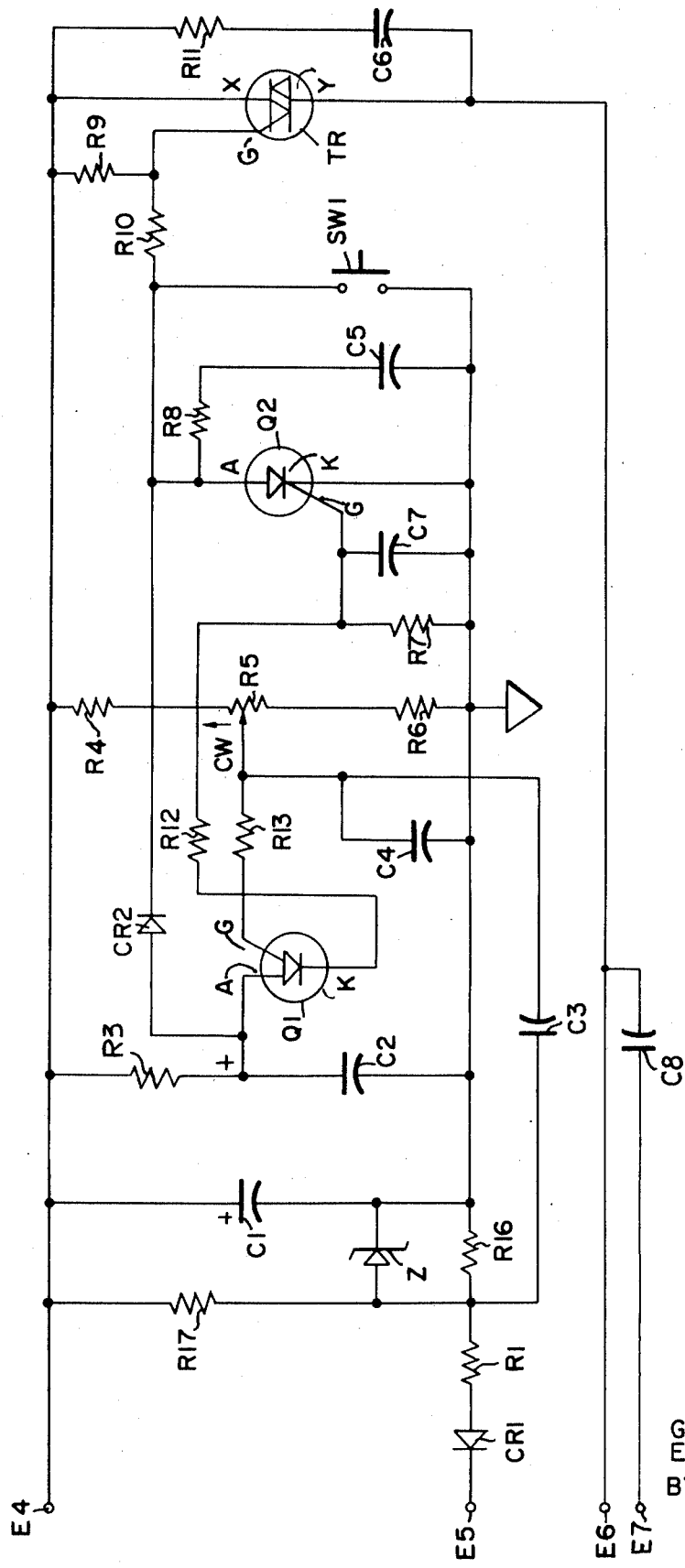

This invention will be better and more clearly understood from the following more detailed description and explanation hereinafter following when read in connection with the accompanying drawing, in which FIG. 1 illustrates schematically general circuitry to be employed for carrying out the principles of this invention;

FIG. 2 schematically illustrates a solid state timing circuit for establishing a sufficiently long time interval, such as five minutes, in an arrangement such as that of FIG. 1; and FIG. 3 illustrates schematically another solid state timing circuit for establishing a relatively shorter time interval, such as two minutes, to accomplish another objective in an arrangement such as that of FIG. 1.

Referring to FIG. 1 of the drawing, there is shown a schematic circuit interconnecting two timing mechanisms TM5 and TM2 with a compressor motor CPM of an air-conditioning system and a source of power G, such as 24 volt A.C. power. The interconnecting circuit includes a first timer switch T5 associated with the timer mechanism TM5 and a second timer switch T2 associated with the timer mechanism TM2. The circuitry also includes a relay RK and a thermostat TH, both of which may be conventional forms of equipment. The timer T5 includes a normally open switch S5 but, when power is applied to the terminals E4 and E5 of the timer mechanism TM5, the switch S5 will be closed after a predetermined interval of time, such as five minutes, has elapsed. The timer T2 includes a switch S2 which is normally closed but, when power is applied to the terminals E1 and E2 of the timer mechanism TM2, the switch S2 will be opened but only after the second predetermined time interval, such as 2 minutes, has elapsed.

As will be explained, the compressor motor CPM can be operated by power supplied by the generator G but only after the timer switch S5 has been closed and only after the thermostat TH has also been closed by a call for airrconditioning power. But, when the motor has stopped operating due to the release of thermostat TH, the timer T5 will be re-energized and will become closed only after the first predetermined interval has again expired. Then and only then may the compressor motor CPM be re-operated. The compressor motor CPM cannot be re-operated (except by means of a test switch SW1) unless the timer switch T5 has gone through its time cycle and become closed.

The timer switch S2 of timer mechanism TM2 will be normally closed when the power of generator G is applied to the terminals E1 and E2 of the timer mechanism TM2, and switch S2 will become opened at the end of a second and different predetermined interval of time, for example, two minutes. If, in the meantime, air-conditioning fluid, such as freon, has been supplied to the air-conditioning system in sufficient amount so as to raise the pressure of the fluid to a desired magnitude, the switch LPS will then be closed and will allow the compressor motor CPM to operate. If the fluid pressure has not reached its desired value, the switch LPS will be released, hence preventing the compressor motor CPM from continuing its operation.

As soon as the motor CPM has stopped operating while the generator G may remain connected to the terminals E4 and E5 of the timer mechanism TM5, the generator terminal G1 will be connected to terminal E4 and at the same time the generator terminal G2 will be connected to terminal E5 over the circuit of conductor L2, the armature and back contact K2 of relay RK. The switch mechanism TM5 is so arranged, as will be explained in reference to FIG. 2, that the normally open switch contact S5 will be closed after a predetermined interval of time, such as five minutes. Hence, the timer contact T5 will be prepared for providing the circuitry to the compressor motor CPM only after the expiration of the necessary time interval.

The generator G will, at the same time, supply voltage to the terminals E1 and E2 of the timer mechanism TM2 when thermostat TH is closed and relay RK is operated. Terminal G1 of generator G will be connected to terminal E1 over a circuit which includes conductor L1, the armature and make contact K1 of relay RK, and thermostat TH. As will be more clearly explained in connection with FIG. 3, the switch S2 will be closed and remain closed for a predetermined interval of time, such as 2 minutes, after which switch S2 will be opened. During this interval, the compressor motor CPM will be energized by generator G through timer T2 and will remain energized if the fluid pressure has been raised enough to close contact LPS.

Assume now that the thermostat TH is in its open position because there has been no call for air-conditioning service. Terminal G1 of generator G will be connected to terminal E4 of the timer mechanism TM5, while the terminal E5 of the timer mechanism TM5 will be connected to the terminal G2 of generator G through the back contact and armature K2 of relay RK and conductor L2. Thus, at the end of the first predetermined time interval, the switch S5 will be closed. Notwithstanding the closure of switch S5, the compressor motor CPM will remain unoperated unless thermostat TH has been operated in response to a call for air-conditioning.

Now assume that there has been a call for cooling power by the closure of the contacts of the thermostat TH. When this happens, the winding of relay RK will be supplied with power over a circuit which includes terminal G1 of generator G, terminal E4, switch S5, terminal E6, thermostat TH, terminal E1 of timer mechanism TM2, switch S2, the winding of relay RK, conductor L4, and the terminal G2 of generator G. Hence, relay RK will be energized and operated. Immediately after the relay RK has been operated, the closure of the contact of armature K3 of relay RK will complete the circuit between the generator G and the compressor motor CPM over a path which includes the conductor L5. Hence the motor CPM will operate and continue to operate as long as the thermostat TH continues to call for power, provided the fluid pressure exceeds a predetermined value.

With the contacts of thermostat TH closed, the operation of relay RK will close its contact K1 and provide a locking circuit to hold the relay RK operated. The locking circuit shorts the path between terminals E4 and E6 through contact K1, thus self-latching relay RK. Relay RK will continue to remain operated if thermostat TH remains closed. At the same time, the opening of contact K2 of relay RK due to the operation of relay RK will disconnect the generator G from the timer mechanism TM5. Hence, the timer mechanism TM5 will be released to its normally open position and remain in that position to provide another time interval.

As already explained, power is also supplied initially to the terminals E1 and E2 of the timer mechanism TM2 and, therefore, the normally closed switch S2 provides a short-circuit across the fluid switch LPS. When the pressure has built up sufficiently, switch LPS closes. Hence, the air-conditioning system will operate for a period, such as 2 minutes. After the 2 minute interval has expired, and if in the meantime the fluid pressure has not built up sufficiently, then switch contact LPS will remain open, opening the circuit to the winding of relay RK and, in turn, opening the circuit of compressor CPM. Hence, the compressor motor CPM cannot operate in the absence of sufficient fluid pressure.

After sufficient cooling has developed so that the thermostat TH has opened its contacts, relay RK will be released. The release of the contact K3 of relay RK will cause the compressor motor CPM to stop due to the opening of its operating circuit. Upon the opening of contact K1 and the closure of contact K2 of relay RK, the timer T5 will again be energized to start the same time interval normally provided by timer T5, namely, a predetermined interval of, for example, 5 minutes. The switch S5 can be closed only after the predetermined time interval has expired. Hence, the compressor motor CPM cannot be started during that interval but only after that interval has expired.

A co-pending application of D. G. Harter, Ser. No. 31,199, filed Apr. 23, 1970, and assigned to the same assignee, illustrates a compressor control network employing two delay networks and a relay controlled by a controller mechanism.

FIG. 2 schematically represents a circuit arrangement for the timer mechanism TM5 of FIG. 1 and it illustrates the condition of the circuitry when relay RK of FIG. 1 is unoperated. Because the relay RK is unoperated, the generator G will be connected across the terminals E4 and E5. A rectified voltage will produce a DC charge on electrolytic capacitor C1, the rectified voltage arising from the inclusion of the rectifier CR1 in the series circuit to the capacitor C1 and resistors R1 and R16. At the same time, a DC voltage will be built up on the anode A of the transistor Q1, the positive voltage being transmitted through the resistor R3. Moreover, a positive voltage will also be applied to the gate G of transistor Q1, this voltage being applied through resistor R4 and tapped from potentiometer R5 and then supplied through resistor R13 to the gate G.

The two voltages, both positive, will be applied to the respective electrodes A and G of transistor Q1. The voltage applied to gate G reaches its steady state value promptly but the voltage on anode A of transistor Q1 rises more slowly due principally to the capacitor C2. After the predetermined interval, such as 5 minutes, the voltage on electrode A will be so much higher than that on electrode G that the transistor Q1 will become conductive. When this happens, the positive voltage applied to the capacitor C2 will be fed through the terminals A and K of transistor Q1 and thence through resistor R12 to the gate G of SCR Q2. The applied positive voltage will render the silicon controlled rectifier Q2 conducting. When this happens, a path will be established through the electrodes X and G of triac TR, resistor R10, and electrodes A and K of silicon controlled rectifier Q2 to ground. The flow of current in the latter path will render the triac TR conducting.

Upon the triac TR becoming conductive (and assuming that the low pressure switch LPS is closed and that the contacts of thermostat TH are closed), power will then be fed from the source G through the electrodes X and Y of the triac TR to the winding of the relay RK which, as shown in FIG. 1, is connected to the terminals E5 and E6. This causes the relay RK to become operated. If the contact K2 of relay RK remains open for a predetermined time interval, such as a 100 milliseconds, thereby denoting the disconnection of generator G from the circuit, the timer T5 will be reset and it will go through its cycle, previously described, promptly upon the closure of the contact K2. The compressor motor CPM can be reconnected after the passage of the long time interval as already explained.

In resetting the circuitry of FIG. 1 after the switch T5 has been closed, all of the capacitors C1 to C5 of FIG. 2 will be discharged (except capacitor C2) through the resistive paths shunting these capacitors. Capacitor C2 discharges through rectifier CR2 and SCR device Q2. The other capacitor discharge paths are clearly shown and need not be detailed. Moreover, the transistor Q1 and the SCR Q2 will become non-conductive and, at the same time, the triac TR will return to its initial non-conductive state.

The circuitry associated with transistor Q1 in the FIG. 2 arrangement is unique in having two voltages applied to its electrodes A and G which rise at different rates, the voltage applied to anode A rising at a slower rate than the voltage on gate G. When the voltage on anode A becomes greater than the voltage on gate G by a predetermined amount, and only then, the transistor Q1 will become conductive. This will be the case at normal temperatures. However, at sub-normal temperatures to which the circuit of FIG. 2 may be exposed, such as minus 25°C, the switching current available to the transistor Q1 may be insufficient to render it conductive. According to this invention, this condition may be overcome by the employment of capacitor C3 in the circuit. Capacitor C3 is connected to capacitor C2 over a circuit which includes the electrodes A and G of transistor Q1, resistor R13 and resistor R16.

Capacitor C3, which is connected in the feed-back path of transistor Q1, derives its voltage from the charging current through capacitor C1. Capacitor C1 receives a charging current from generator G through rectifier CR1 and resistors R1 and R16. A negative pulse is then developed across resistor R16 which is fed through capacitor C3 to the gate G of transistor Q1 and resistor R13. This feed-back voltage derived from resistor R16 serves to further reduce the voltage on gate G with respect to the voltage on the anode A of transistor Q1 and causes transistor Q1 to become conductive under the abnormal temperature conditions.

The addition of capacitor C3 to the circuitry of FIG. 2 provides a simple and inexpensive arrangement for keeping the timer T5 operative even at sub-normal temperatures such as minus 25°C or lower. Alternative methods may be developed to accomplish a similar purpose, but they would usually require the employment of one or more additional transistors in tandem with transistor Q1 to introduce the necessary switching current to operate the network of FIG. 2.

FIG. 3 schematically illustrates the timer mechanism generally represented as TM2 in FIG. 1. This timer mechanism parallels the switch LPS of FIG. 1 which is normally open and becomes closed for a substantial predetermined time interval in response to the attainment of sufficient pressure in the fluid fed to the conventional compressor of an air-conditioning system.

FIG. 3 is, in many respects, similar to the arrangement of FIG. 2, except that an additional transistor Q4 and appropriate circuit elements are inserted between SCR device Q2 and triac TR of FIG. 2. Transistor Q4 operates as an inverter to render the triac TR non-conductive instead of conductive, and vice versa.

When SCR device Q2 of FIG. 3 is in its conductive state, no current can flow to the base of transistor Q4 and hence transistor Q4 will be non-conducting. However, as soon as SCR device Q2 becomes non-conducting, the base B of transistor Q4 will receive current through resistors R15 and R8. This current then renders transistor Q4 conducting. As soon as transistor Q4 becomes conducting, the triac TR will become conducting by establishing a path for the flow of current through electrodes X and G of triac TR and through the collector and emitter electrodes of transistor Q4 to ground.

When the triac TR becomes conductive, its impedance will drop off to a negligible value. Hence, the winding of relay RK, which is connected to the terminals E2 and E3, will be energized, as already explained in connection with FIG. 1.

One of the essential physical differences between the circuits of FIGS. 2 and 3 is in the sizes of their respective capacitors C2. The capacitor C2 of FIG. 3 may have capacitance of about two microfarads, while the capacitor C2 of FIG. 2 may have a capacitance of about five microfarads. Capacitor C2 is an important element in the circuit in establishing the magnitude of the delay interposed by the timer circuit.

In each of FIGS. 2 and 3, a Zener diode Z is shown connected across resistor R16. This Zener diode limits the voltage drop across resistor R16 due to noise spikes and hence limits the magnitude of the feedback pulses fed through capacitor C3 to the gate of transistor Q1. The Zener diode Z therefore prevents erratic timing due to noise or other superimposed voltages and this is a feature of this invention.

It will be apparent that this invention provides a feature for preventing the compressor motor CPM from starting up due to a power interruption occurring during the timing cycle of timer TM5 while the thermostat TH remains operated. If, during the timing cycle of timer TM5, power should be interrupted for a period of two seconds or longer due, for example, to a lightning storm or to accidental circuit breaker tripping, or the like, and then power reapplied, the motor CPM will remain released according to this invention until the completion of a new five minute interval again developed and established by the same timer mechanism TM5 now responding anew to the re-connected power supply circuit after the lightning or other interruption has ceased.

The circuitry of this invention is provided for preventing the intermittent operation of the relay RK by jiggling or making quick changes in the condition of the thermostat TH during the overall time cycle that is required to operate the timer mechanism TM5. This arrangement prevents the motor CPM from being operated during any such jiggling operation. The jiggling of the thermostat TH is one of several means by which the operation of the motor CPM may be inadvertently started and stopped and may therefore adversely introduce undesired and intermittent interruptions of motor CPM. In the absence of such jiggling or other interruptions, the compressor motor CPM will be operated continually until the thermostat TH is released.

The switch SW1, which is shown in FIG. 1, may be a conventional push button controlled switch. When it is actuated, it serves to bypass part of the circuitry of the timer switch T5 of FIG. 2 and it, therefore, bypasses the usual timing cycle of, for example, 5 minutes. Thus, by pushing the switch button SW1, the triac TR will conduct, thereby operating the relay RK and causing the motor CPM to operate (assuming that thermostat TH remains closed). The push button switch SW1 is, therefore, employed primarily for testing purposes.

While the invention has been described with respect to an air-conditioning system employing a compressor motor, this has been described merely for illustration. The arrangement of this invention is equally applicable to any load device in place of the motor CPM, whether employed for air-conditioning purposes or for any other purpose.

While this invention has been shown and described in certain particular arrangements merely for illustration and explanation, it will be apparent that the arrangements of this invention may be embodied in many other and widely varied organizations, all of which are provided for the purpose of establishing a time interval before a load device may be operated, or for preventing the load device from operating until some specified condition is satisfied, such as the advent of sufficient fluid pressure.

What is claimed is:

1. A regulating system including the combination of a source of power, a load, a switch interconnecting said source with said load to operate said load, means responsive to the operation of said switch to delay the interconnection of said source to said load to operate said load after a predetermined time interval which is sufficiently long as to prevent random intermittent operation of the load, means to prevent the interconnection of said source to said load to re-operate said load while said switch is re-operated during said time interval, and means to prevent the reactivation of said load in response to an interruption of the interconnected circuit during said predetermined time interval, said delay means including a normally non-conductive device to which two D. C. voltages are supplied which rise in magnitudes at different rates to render said device conductive when the D. C. voltage difference reaches a predetermined value.

2. A regulating network according to claim 1 in which said switch and said delay means also includes a feedback path feeding additional voltage to said device supplied with D.C. voltages.

3. A regulating network according to claim 1 in which the delay means for said switch includes means to render the delay network responsive over a wide temperature range, said means including a feedback path feeding D.C. voltage between the two electrodes to which the D.C. voltages are applied.

4. The combination of a source of power a load, switch mechanism interconnecting said source with said load, means responsive to the operation of said switch mechanism to prevent the operation of said load by power from said source during a predetermined time interval after said switch mechanism has been operated, said means including means to prevent the reactivation of said load in response to an inadvertent interruption of the interconnecting circuit during said predetermined time interval, said means including a device which receives two D. C. voltages which rise in magnitudes at different rates and activate the device when the difference between said two D. C. voltages reaches a predetermined value, said switching mechanism including means for substantially reducing the effect of noise currents on the operation of said switch mechanism.

5. The combination of claim 4 in which the switch mechanism includes a thermostat.

6. The combination of claim 4 in which the noise reducing means comprises a Zener diode in parallel with a resistor for feeding D.C. voltage to the device.

7. Apparatus for protecting a motor against random start and stop operations after said motor has been connected to its source of power, comprising means including a delay circuit coupling said motor to said source of power to introduce a delay of a predetermined time interval in the operation of said motor, said delay circuit means having means for developing two D.C. voltages which rise in magnitudes at different rates and introduce the delay interval when the difference between said D.C. voltages reaches a predetermined magnitude, means responsive to any interruption of said interconnected circuit to de-activate said motor, and means to prevent the re-activation of said motor if there is any interruption of said interconnected circuit during said predetermined interval.

8. Apparatus according to claim 7 in which the apparatus includes a thermostat for responding to temperature variations.

9. Apparatus for rendering a transistor substantially independent of wide temperature variations, the transistor including first, second and third electrodes, comprising means for applying between the first and second electrodes respective D.C. voltages which rise in magnitudes at different rates, said transistor being rendered conductive when the voltage difference between the first and second electrodes reaches a predetermined value, an output circuit connected between the first and third electrodes, and means for feeding a negative voltage to the second electrode.

10. A delay circuit for introducing delay in the operation of a load, comprising a transistor having first, second and third electrodes, means for applying to the first and second electrodes, respectively, pulses of D.C. current which vary at different rates, the load being connected to a second device, and means for rendering the operation of said delay circuit substantially independent of wide temperature variations, said means including a feedback path for applying a negative voltage to the second electrode.

11. A delay circuit according to claim 10 including means for rendering the transistor conductive when the voltage applied to the first electrode exceeds that applied to the second electrode by a predetermined amount and for rendering the transistor non-conductive when said voltage is below said predetermined voltage.

12. A regulating system for an air-conditioner having a compressor to which refrigerating fluid is transmitted and a motor for operating the compressor, comprising switch mechanism interconnecting said motor to its source of power, means responsive to the operation of said switch mechanism to delay the interconnection of said motor to its source of power and thereby to delay the operation of said motor until the expiration of a first predetermined time interval which is sufficiently long so as to prevent random intermittent operation of said motor, said responsive means including a normally non-conductive device to which are supplied two D.C. voltages which rise in magnitudes and which becomes conductive when the difference between the D.C. voltages reaches a predetermined magnitude, and means to prevent the operation of said motor in response to the operation of said switch mechanism during a second predetermined time interval to allow the pressure of the fluid supplied to the compressor to reach a predetermined magnitude and to prevent the connection of said motor to said load in the absence of the pressure of said fluid reaching the said predetermined magnitude.

13. A regulating system according to claim 12 in which each means for introducing a delay of a predetermined time interval in the operation of said motor includes means to render said delay networks responsive over a wide temperature range.

14. A regulating system according to claim 12 in which the switch mechanism includes a thermostat.

* * * * *